(12) United States Patent
Fricke et al.

(10) Patent No.: US 9,316,204 B2
(45) Date of Patent: Apr. 19, 2016

(54) COMPONENTS OF A WIND POWER PLANT

(75) Inventors: Werner Fricke, Aurich (DE); Florian Sartorius, Leer (DE); Christian Baumgaertel, Aurich (DE); Arno Hildebrand, Wittmund (DE); Wilko Gudewer, Norden (DE); Peter Geiken, Emden (DE); Jochen Roer, Ganderkesee (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 164 days.

(21) Appl. No.: 13/883,453

(22) PCT Filed: Nov. 4, 2011

(86) PCT No.: PCT/EP2011/069459
§ 371 (c)(1),
(2), (4) Date: Aug. 19, 2013

(87) PCT Pub. No.: WO2012/059591
PCT Pub. Date: May 10, 2012

(65) Prior Publication Data
US 2013/0334819 A1 Dec. 19, 2013

(30) Foreign Application Priority Data
Nov. 4, 2010 (DE) .......................... 10 2010 043 435

(51) Int. Cl.
*F03D 9/00* (2006.01)
*F03D 7/02* (2006.01)
(Continued)

(52) U.S. Cl.
CPC .............. *F03D 7/0204* (2013.01); *F03D 1/001* (2013.01); *F03D 1/003* (2013.01); *F03D 1/0691* (2013.01); *F03D 11/005* (2013.01); *F03D 11/0058* (2013.01); *F03D 11/028* (2013.01); *F03D 11/04* (2013.01); *F05B 2220/7066* (2013.01); *F05B 2230/601* (2013.01); *F05B 2240/14* (2013.01); *F05B 2260/20* (2013.01); *Y02E 10/721* (2013.01); *Y02E 10/722* (2013.01); *Y02E 10/725* (2013.01); *Y02E 10/726* (2013.01); *Y02E 10/728* (2013.01); *Y02P 70/523* (2015.11); *Y02T 50/675* (2013.01)

(58) Field of Classification Search
CPC ....................................................... F03D 11/04
USPC .................................................... 390/44, 55
See application file for complete search history.

(56) References Cited

U.S. PATENT DOCUMENTS 6,285,090 B1   9/2001   Brutsaert et al.
6,459,165 B1 * 10/2002   Schoo ........................... 290/1 C
(Continued)

FOREIGN PATENT DOCUMENTS

DE         101 02 225 A1   8/2002
DE    10 2008 038 740 A1   2/2010
(Continued)

*Primary Examiner* — Tho D Ta
(74) *Attorney, Agent, or Firm* — Seed Intellectual Property Law Group PLLC

(57) ABSTRACT

The present invention concerns a module carrier for fixing electric modules provided for controlling one or more pitch drives of a wind power installation to a rotor hub of the wind power installation comprising a main body for carrying the electric modules, wherein the rotor hub is adapted to rotate about a substantially horizontal rotor axis, and the main body is adapted to be fixed in front of the rotor hub in the axial direction of the rotor axis.

16 Claims, 14 Drawing Sheets

(51) Int. Cl.
*F03D 11/04* (2006.01)
*F03D 1/00* (2006.01)
*F03D 1/06* (2006.01)
*F03D 11/00* (2006.01)
*F03D 11/02* (2006.01)

(56) References Cited

U.S. PATENT DOCUMENTS

| | | | |
|---|---|---|---|
| 7,160,083 B2 | 1/2007 | Pierce et al. | |
| 7,205,678 B2 * | 4/2007 | Casazza et al. | 290/55 |
| 8,021,121 B2 * | 9/2011 | Mikkelsen et al. | 416/245 R |
| 8,052,396 B2 * | 11/2011 | Wobben | 416/244 R |
| 8,053,918 B2 * | 11/2011 | Wobben | 290/55 |
| 8,274,170 B2 * | 9/2012 | Kassner | 290/55 |
| 8,281,546 B2 * | 10/2012 | Thompson | 52/745.17 |
| 8,405,243 B2 * | 3/2013 | Siegfriedsen | 290/55 |
| 8,421,262 B2 * | 4/2013 | Lauke | 290/55 |
| 8,536,728 B2 * | 9/2013 | Mascioni | 290/55 |
| 2010/0061852 A1 | 3/2010 | Potter et al. | |
| 2010/0164228 A1 | 7/2010 | Matsuo et al. | |
| 2010/0181769 A1 * | 7/2010 | Altemark et al. | 290/44 |
| 2011/0158818 A1 * | 6/2011 | Andersen et al. | 416/244 A |
| 2012/0223523 A1 | 9/2012 | Bertolotti et al. | |

FOREIGN PATENT DOCUMENTS

| | | |
|---|---|---|
| DE | 10 2009 008 437 A1 | 8/2010 |
| DE | 10 2009 044 570 A1 | 5/2011 |
| EP | 1 319 830 A1 | 6/2003 |
| EP | 1 394 406 A2 | 3/2004 |
| EP | 1 837 519 A2 | 9/2007 |
| EP | 2 194 269 A1 | 6/2010 |
| KR | 10-2011-0063531 A | 6/2011 |
| WO | 2009/125121 A2 | 10/2009 |
| WO | 2011/061016 A1 | 5/2011 |

* cited by examiner

COMPONENTS OF A WIND POWER PLANT

BACKGROUND

1. Technical Field

The present invention concerns a wind power installation. The invention further concerns a module carrier, a rotor hub, a machine carrier, a generator structure, a mounting attachment, a pod structure and a pod of a wind power installation. The invention further concerns a method of erecting a wind power installation and a method of operating a wind power installation.

2. Description of the Related Art

Wind power installations are generally known and substantially comprise a pylon and a pod with an aerodynamic rotor having rotor blades as well as an electric generator. FIG. 1 shows such a basic structure of a wind power installation.

Wind power installations are used to generate electrical energy from wind. As no costs are involved in a wind power installation for the primary energy, namely the wind, the costs of generating electrical energy depend on the procurement and operation of the wind power installation. To be able to increase the energy yield from the wind, larger wind power installations can be built. Such larger wind power installations however usually result in higher procurement and operating costs which usually increase to the extent to which the targeted increase in energy yield from the wind rises therewith. Often the costs of such a larger wind power installation even rise more steeply. Thus a greater wind yield can be achieved at a location with larger wind power installations, but ultimately that does not involve achieving less expensive generation of electrical energy.

BRIEF SUMMARY

One or more embodiments of the present invention are directed to improving the energy yield from the wind.

According to one embodiment of the invention there is proposed a module carrier for fastening electric modules to the rotor hub of the wind power installation. Such electric modules are used for controlling one or more pitch drives of a wind power installation. Particularly in the case of a wind power installation having a plurality of rotor blades a corresponding plurality of pitch drives are provided. A pitch drive is a drive which adjusts the angle of incidence of a rotor blade relative to the wind, which is also referred to as pitching. There is at least one pitch drive per rotor blade. Thus in the case of a wind power installation having three rotor blades there are at least three pitch drives. When using two or more pitch drives per rotor blade—which is proposed for example for redundancy reasons to increase the safeguard against failure—correspondingly more pitch drives can be provided.

The pitch drives are to be suitably actuated and the following electric modules can be provided for that purpose.

There is provided a transformer module to supply the pitch drives with electrical energy, namely to transform electrical energy provided from an external supply network in such a way, and in particular to reduce it in voltage, that it is suitable for actuation of the pitch drives. It may be sufficient to provide one transformer module for all pitch drives so that only one transformer would be required. It will be appreciated that it is also possible to provide a plurality of transformer modules.

In addition there can be a distribution module which distributes in particular items of digital information to each pitch drive. In particular central control values or presetting values such as for example a rotor blade angle to be set, which can apply to all rotor blades, can be preset by a central control unit and can be passed by the distribution module to the pitch drives. Such transmission of the values can be directly sent to the pitch drive, or however to a control unit associated with the respective pitch drive. Such a control unit can be accommodated in a blade regulating module. Such a blade regulating module is thus to be provided in particular for each respective pitch drive, but at least for each rotor blade.

In addition there can be provided a blade relay module for each rotor blade. Such a blade relay module can effect electrical switching-over procedures. That can include switching over from a conventional control based on an external supply network to a control based on an electric emergency storage means. A blade relay module is usually also provided for each respective rotor blade.

The above-mentioned emergency storage unit can be provided in the form of a storage module, namely an electric storage module for storing electrical energy. A preferred variant is the use of a capacitor module in which the electrical energy for actuating a pitch motor, that is to say a pitch drive, is stored in a capacitor module. Such an electric storage means, that is to say such a storage module, is preferably also provided for each rotor blade.

Thus for a wind power installation having rotor blades, there would be a desire for a transformer module, a distribution module, three blade regulating modules, three blade relay modules and three storage modules. Therefore 11 modules would be utilized, all for actuation of the pitch drives. The pitch drives, due to the function involved, are arranged at the rotor blade and thus at the rotor hub of the wind power installation. It will be appreciated that the rotor hub rotates relative to other parts of the wind power installation, in particular to other parts of the pod of the wind power installation. Therefore the above-mentioned modules must also be provided on and fastened to the rotating rotor hub. To reduce the complication and expenditure involved in fastening 11 modules, the module carrier is therefore proposed. All the above-described modules are fastened on the module carrier, in particular on a main body, and that main body and therewith the module carrier as such are ready to be fastened in front of the rotor hub in the axial direction of the rotor axis. An embodiment of the present invention is based on a wind power installation having a substantially horizontal rotor axis. In front of the rotor hub in the axial direction of the rotor axis relates to a position of the rotor hub towards the wind, in intended use of the wind power installation.

That has the advantage that the wind power installation and in particular its pod can be substantially produced and constructed and towards the end of constructing the wind power installation, the module carrier with all modules can be fastened from the front to the rotor hub, as described above. Fastening of the individual modules—11 modules in the above example—to the module carrier can be readily prepared in the production works. Then only that prefabricated module carrier, that is to say already fitted with the modules, needs to be fastened to the rotor hub at the location for erection of the wind power installation. The connections for connection to the pitch drives and any connections towards the pod can then be implemented for example by way of plug connectors and/or by way of a slip ring device. The complication and expenditure and in addition also susceptibility to faults when arranging the described modules can thus be reduced. That also entails a reduction in cost. It is to be noted that fastening modules to the rotor hub which continuously rotates in operation of the wind power installation is subject to particular demands, because of that rotation. Any fastening problems for individual modules can be reduced or even eliminated by pre-equipping the module carrier with the modules in the factory. In addition, besides the continuous rotary movement, vibrations also occur precisely at the rotor hub, and such vibrations also lead to corresponding demands and loads on any elements at the rotor hub.

The carrier body and thus accordingly also the module carrier is preferably in the form of an annular disc. Such an annular disc accommodates all modules basically in a circular arrangement and can then be fastened to the rotor hub. In that way the modules can be arranged substantially symmetrically around the rotor axis. With good space utilization, that avoids eccentricity with respect to the modules. It is to be noted in that respect that such a module carrier with the specified modules can be for example of a weight of 1.5 t in the case of a 3 MW wind power installation. Preferably therefore there is proposed an arrangement of the module carrier, in which the module carrier and in particular the carrier body are arranged basically perpendicularly to the rotor axis. That applies in particular for the described use of a carrier body or module carrier which is substantially in the form of an annular disc.

To protect in particular those modules and possibly other components of the rotor hub, there is provided a casing for the rotor hub, which is generally referred to as the spinner casing. The spinner casing thus covers over in particular the module carrier and protects it from weather. For that purpose the module carrier can be adapted to the contour and size of the spinner casing. For example adaptation to the spinner casing can also be effected when using the above-described structure in the form of an annular disc.

The spinner casing can have a spinner cap inter alia for a front region of the rotor hub and thus the region in which the module carrier will be disposed. That spinner cap is to be connected to the rest of the spinner casing when erecting the wind power installation. An elastic connection can be provided between such a spinner cap and the module carrier for transport purposes. When the module carrier is then fastened to the rotor hub it is possible for the spinner cap to be left nonetheless fastened to the carrier module. Stresses occurring are avoided by using an elastic connection.

In addition there is proposed a rotor hub of a wind power installation having a module carrier as described. The module carrier is arranged rigidly on and fastened to the rotor hub at its side towards the wind by means of holding devices. In that case fastening is preferably effected in such a way that the module carrier with its main body and thus the module carrier as such is arranged substantially perpendicularly to the rotor axis. In addition, as described, an elastic connection can be provided between the module carrier and the spinner casing, in particular the spinner cap.

In addition there is proposed a machine carrier of a gearless wind power installation for carrying an electric generator connected to an aerodynamic rotor of the wind power installation. In the case of gearless wind power installations the electric generator assumes quite considerable structural dimensions. Such a generator can be of a diameter of 5 m, a depth of 1 m and can be of a weight of far above 50 t to give only approximate values for clarification purposes. Such a generator must ultimately be carried by the machine carrier. Added to that is the weight and also the wind loading due to the aerodynamic rotor, that is to say in particular due to the rotor blades. In the end all those forces have to be transmitted to the wind power installation pylon by way of the machine carrier. The machine carrier thus represents the transitional element from generator and rotor to the pylon, with the machine carrier being fixed on an azimuth bearing. The aerodynamic rotor and also the electric rotor have a substantially horizontal rotor axis whereas the pylon has a substantially vertical pylon axis. The expression a substantially horizontal rotor axis is used to mean in particular that it is not approximately vertical. The horizontal rotor axis also concerns the present type of wind power installation, namely a so-called horizontal-axis wind power installation. Slightly inclined positions for the rotor axis are also embraced by the expression a substantially horizontal rotor axis.

The proposed machine carrier has a first and a second portion which are each approximately tubular. Those two tubular portions partially pass through each other. In particular the first tubular portion is of such a configuration that it accommodates the second tubular portion. The second tubular portion thus partly passes through the first tubular portion. In addition there are parts of the first tubular portion in the interior of the second tubular portion so that the first tubular portion also partially passes through the second one. At least one of the two tubular portions should at least partially pass through the other.

In this case the expression tubular portion means a portion which is of a shape which in respect of its shape is cut out of a tube—which can also be conical. There is at least a portion which is in the shape of a circular ring.

Preferably the first tubular portion has a central axis coincident with the vertical pylon axis. Such a central axis would also correspond to a perpendicular line through the described circular ring portion. It is not important for the vertical pylon axis to absolutely exactly coincide with said central axis of the first tubular portion. Nonetheless the preferred configuration is such that the first tubular portion can be viewed substantially as an extension of the also tubular pylon.

It is also preferably proposed that the second tubular portion has a central axis coincident with the rotor axis. To carry the generator and/or the rotor hub there can be provided a journal and/or a mounting attachment which themselves have a central axis coincident with the rotor axis, that is to say the axis of rotation of the rotor. That journal and/or that mounting attachment can represent an extension of the second tubular portion of the machine carrier.

Expressed in concrete terms the proposed machine carrier provides for this embodiment a connection between the pylon and the journal or mounting attachment. The axes thereof preferably meet in the machine carrier.

Preferably the first tubular portion is of a larger mean diameter than the second tubular portion. This configuration can also reflect the greatest ratios of the pylon diameter on the one hand and the diameter of the journal or mounting attachment on the other hand, although usually neither the pylon nor the journal or mounting attachment are of a respectively constant diameter in the axial direction. Nonetheless in an embodiment it is possible to see a continuation of both elements in the machine carrier. Preferably at least one of the two tubular portions and in particular both are of a conical configuration. That also matches the described continuation of the shape of the pylon on the one hand and the journal or mounting attachment on the other hand. The proposed machine carrier thus provides an adapted and stable transmission of force between the generator and rotor hub on the one hand and the pylon on the other hand.

Preferably the machine carrier is such that there is provided a lateral access opening. That lateral access opening is such that it provides a way for a person from the interior of the pylon to the pod, which extends through the inner region of the first tubular portion and laterally past the second tubular portion. In particular in a configuration involving a first tubular portion of larger diameter and a second tubular portion of smaller diameter, wherein the second tubular portion is basically accommodated by the first tubular portion, that involves size ratios which can be used for the described configuration of an access passage for people.

It is desirable for the machine carrier to be in the form of a casting, that is to say a steel casting. That provides a solid stable element as the machine carrier. It is therefore to be emphasized that the described tubular configuration for the two first and second tubular portions can ultimately be provided in a single casting. In other words, although in appearance there is a passage at least in part between the two tubular portions, that passage however does not mean that the two tubular portions are fitted together. Rather, a configuration as described can be specifically selected to take account of the situation of the wind power installation, in particular to achieve specifically targeted transmission of loads. In particular this involves a load deflection—expressed in clear terms—from the substantially horizontal rotor axis to the substantially vertical pylon axis.

Preferably the machine carrier has one or more receiving portions for receiving azimuth drives. Depending on the respective specific installation, there can be for example 4 to 20, preferably 12, azimuth drives. Those azimuth drives are thus fixed directly to the machine carrier in that respective receiving portion and can thus rotate the machine carrier relative to the pylon and thus rotate the pod of the wind power installation, in particular including its rotor, into the wind.

According to an embodiment of the invention there is also proposed a generator carrier structure for carrying an electric generator of a gearless wind power installation. The electric generator has a stator and a rotor. The rotor is referred to as the electric rotor to avoid confusion with the aerodynamic rotor having rotor blades. For the same reason the term "rotor member" can also be used instead of the term "electric rotor".

The generator carrier structure can have a machine carrier, in particular according to one of the described embodiments of a machine carrier. In addition there can be provided a mounting attachment for fixing to the machine carrier and for carrying a stator carrier. The mounting attachment is thus fixed to the machine carrier and the stator carrier is fixed thereto. The stator carrier can preferably be in the form of a stator bell. The stator carrier is thus of an approximately bell-shaped form to carry the stator at its edge and for that purpose it is intended to be fixed in a central region to the mounting attachment. In normal use the stator is then arranged concentrically around the mounting attachment and thus concentrically around a rotor axis.

In a corresponding manner the stator carrier can also be provided as part of the generator carrier structure. In addition there can be provided a journal for fixing to the mounting attachment and for carrying the electric rotor or rotor member. At the same time the journal can carry a rotor hub with aerodynamic rotor. In that case the journal is fixedly secured to the mounting attachment and the electric and also the aerodynamic rotor are carried by means of at least one and preferably at least two bearings to mount the electric and aerodynamic rotors rotatably on the journal. When using two bearings they are preferably provided at two outer ends of the journal—with respect to an axis of the journal. That achieves a high level of stability in respect of tilting.

In particular the generator carrier structure includes the machine carrier, the mounting attachment, the stator carrier and the journal. The mounting attachment in that case represents a connecting member between the machine carrier, the stator carrier and the journal. The mounting attachment is thus arranged between the machine carrier and the journal and the stator carrier is arranged substantially around the mounting attachment. That configuration makes it possible to provide the mounting attachment and the stator carrier as separate elements and in particular also to transport them as separate elements from their production factory to the place of erection of the wind power installation. Both the mounting attachment and also the stator carrier can each be of a weight of over 10 t, such as for example 13 or 14 t, and such weights can now be transported separately.

Preferably the mounting attachment and/or the journal are hollow to pass cooling air through there, namely in the axial direction. In that way cooling air can be passed from the stationary part of the pod to the rotating part of the pod, namely to the so-called spinner, that is to say to the region of the rotor hub. For that purpose it is desirable for the hollow space to be of a correspondingly large nature for guiding the cooling air. In particular the space is to be made larger than would be necessary for laying necessary electric lines through the journal and/or mounting attachment. Preferably the volume of the hollow space in the journal or the mounting attachment is greater than the volume of the material forming the wall of the journal or mounting attachment. Preferably the radius of the space is greater than the wall thickness. The respective outside diameter is therefore less than double the corresponding inside diameter. Preferably the outside diameter is only 20 to 50% greater than the inside diameter.

In a further embodiment it is proposed that a fan is arranged in the mounting attachment and/or the journal to produce an air flow through the mounting attachment or journal. Such a fan can blow air in the axial direction into the mounting attachment or journal. For that purpose a transverse wall can be arranged in the journal or mounting attachment for compartmentalization purposes, with the fan arranged in the transverse wall.

According to an embodiment of the invention there is also proposed the provision of a mounting attachment as described above. The generator carrier structure and therewith also the mounting attachment are intended for a gearless wind power installation. That is used to mean a structure in which the aerodynamic rotor is directly mechanically coupled to the electric rotor, that is to say the rotor member, namely being fixedly connected thereto. Such a type of wind power installation presupposes a correspondingly large generator with a correspondingly large electric rotor, in particular a generator having a multiplicity of poles. A so-called ring generator is usually employed for that purpose, in which the rotor and the stator are substantially arranged on a ring, in respect of their electrodynamic components. The generator carrier structure and correspondingly the mounting attachment are used for carrying such a generator.

In accordance with an embodiment of the invention there is also proposed a pod structure of a pod of a wind power installation. That pod structure is also proposed in particular for a gearless wind power installation. Such a pod structure is intended for carrying at least a part of a pod casing, technical devices in the pod and/or for supporting people in the pod. The proposed pod structure includes at least one base platform portion which is fixed in flexurally stiff relationship to a machine carrier. That base platform portion is thus a fixed portion which is also to be walked upon by people, in particular service personnel. It is preferably arranged in a lower region around the machine carrier. Therefore it is possible to stand on that base platform portion directly beside the machine carrier or to arrange technical equipment there.

In addition there is provided a suspended platform portion which is arranged in suspended relationship on the machine carrier and/or the base platform portion. Such a suspended platform portion can be arranged in particular in a rear region behind the machine carrier in order to provide space there for technical devices and/or for access to personnel. That suspended platform portion can be provided in a simple fashion by virtue of the structure of a substantially suspended nature.

Preferably a support structure is arranged and fixed on the base platform portion. The support structure has a projecting carrier portion, in particular a steel carrier, like a double-T-shaped carrier or the like. That carrier portion is arranged in particular in the region above the machine carrier and can have a crane device for lifting loads. The carrier portion preferably extends rearwardly, that is to say into a region behind the machine carrier, that is to say a region remote from the hub side. In addition or alternatively the carrier portion can be connected to at least one tensile carrier connected to the suspended platform portion to partially hold the suspended platform portion. Such holding is effected in particular in the manner of a hangar arrangement. Nonetheless the tensile carrier can also be in the form of a tensile bar.

The support structure thus affords a carrier portion which can perform a dual function, namely it can be used as a crane and it can carry the suspended platform portion. That makes it possible for the suspended platform portion to be of a less massive configuration than if a flexurally stiff fixing had to be employed for fixing same to the machine carrier or the base platform portion.

In addition or alternatively the support structure carries an upper platform, namely a platform which is arranged in elevated relationship to the base platform or the base platform portion. In particular that upper platform is arranged above and over the machine carrier. That upper platform can for example accommodate electric equipment like a rectifier. In addition the support structure carries an intermediate platform which is arranged between the base platform portion and the upper platform in a vertical direction. In particular that intermediate platform is arranged beside or at half the height of the machine carrier. In particular the base platform portion is arranged above the azimuth drives. In that way the space immediately above the azimuth drives can be put to use to be able to gain access there as service personnel and also to easily gain access to the azimuth drives. To maintain or possibly replace the azimuth drives from there, parts of the intermediate platform, in particular movable floor panels, can be provided, which can be removed for that purpose.

In addition or alternatively a frame ring is arranged on the machine carrier and additionally or alternatively on the support structure, which ring can carry or at least stiffen a pod casing or a part thereof. That makes it possible to have a comparatively large pod and therewith a large pod casing which by virtue of such a ring can enjoy additional stabilization and in particular stiffening.

According to an embodiment of the invention there is also proposed a pod of a wind power installation, in particular a gearless wind power installation. Such a pod accommodates technical equipment required for operation of the wind power installation. They include in particular the generator and electric connections thereof. The machine carrier and other structural elements are also accommodated in the pod and the pod includes a pod casing for protecting the technical equipment from weather. In other words, a substantially closed-off operating space is created by the pod casing.

Ventilation openings are provided in the pod casing for letting in outside air for ventilating the pod and/or for cooling the wind power installation or parts thereof. There is provided at least one ventilation opening. The ventilation openings have drop separators to remove moisture from inflowing air. The openings with that drop separator are preferably provided at side regions of the pod and thus the pod casing.

Hitherto it was the usual practice that air could flow into the pod through openings which are protected from rain, if there was a need for that. Such a protected opening can be provided for example beneath the pod in a transitional region to the pylon. An opening ring gap is usually provided at that location because the pod moves relative to the pylon upon azimuth displacement. Depending on the respective weather conditions such as for example in the presence of fog or also in the presence of severe rainfall there was the risk that nonetheless moisture would be drawn in with the air through such rain-protected openings. A solution is proposed in that respect by the use of the droplet separators. Another variant in terms of drawing in dry air involved allowing the air to flow from the interior of the pylon into the pod. The pylon air however was found to be in part excessively hot as it is already heated by equipment in particular in the base of the pylon. Accordingly the pylon air is not very well suited for cooling purposes. The proposed solution avoids drawing in hot air from the pylon. Preferably therefore there is a substantially air-tight sealing means both in the transitional region between the pod casing and the pylon and also towards the pylon interior in order thereby to restrict the supply of cooling air specifically to external air which has passed the aforementioned droplet separators.

Therefore at least one cooling fan is provided in the pod. Those fans convey air from a first pod region to the region or regions at which cooling is required. That results in a reduced pressure in that first pod region, leading to outside air being drawn in through the openings with the droplet separator, into that first region. For example outside air can flow from the outside through the droplet separator into the first region of the pod, from there it can further flow by means of a fan through a hollow space in the mounting attachment and further through a hollow space in the journal into the spinner region and thus into the hub region in order there to cool electric devices such as pitch drives and the modules thereof. Then the air issues from the spinner or hub region in a transitional region between the spinner casing and the pod casing, that is to say issues from the pod again in a region between the stationary and rotating casings.

A preferred pod and also a preferred wind power installation thus includes at least one pod structure according to the invention, a frame ring for carrying and/or stiffening the pod casing or a part thereof, a module carrier according to the invention, a rotor hub according to the invention, a machine carrier according to the invention, a generator support structure according to the invention and/or a mounting attachment according to the invention.

A wind power installation according to the invention has in particular a pod according to the invention. Preferably a sealing means to prevent the passage of outside air is thus provided in a transitional region between the pod casing and the pylon and/or the pylon is sealed in its interior to prevent the passage of air from the interior of the pylon. For that purpose for example an intermediate platform which is of a suitably air-tight configuration can be provided in the upper region of the pylon. It is to be emphasized that air-tightness here can certainly have relatively small openings. Sealing integrity is to be effected to such an extent that no or only small amounts of air pass into the pod through the sealed-off regions. In particular a strong air flow is to be prevented and smaller air flows can be acceptable. It may also be harmless if an opening is opened in such an intermediate plane in the pylon for example to permit service personnel to pass through. An air lock is not absolutely necessary but can be provided.

According to an embodiment of the invention there is proposed a method of erecting a wind power installation. That involves using a module carrier which is pre-fitted or pre-manufactured with electric modules provided for controlling one or pitch drives of a wind power installation, in particular being a module carrier according to the invention. The wind power installation is assembled to the maximum possible extent at least in respect of the pod and in particular the hub. The finished hub which in this case is either already provided with rotor blades or rotor blades are only later fitted is then equipped with the module carrier. The module carrier is thus fixed in the rotor hub and accordingly all modules necessary for operation of the pitch drives are in place. The necessary electric connections can be easily made by way of suitable plug connectors. For feeding electrical energy or signals from the stationary part of the pod it is possible to provide a slip ring device which in particular can be arranged at, namely in front of, a journal. When using a module carrier which is substantially in the form of a circular disc or a ring disc, that slip ring arrangement does not impede fixing of the module carrier to the rotor hub, but is disposed in a central opened-out region of the module carrier. Finally an electric connection can be easily made with corresponding lines of the slip ring arrangement by means of plug connectors to the module carrier or the modules arranged thereon. In particular a connection is made between the slip ring arrangement and transformer module and/or distribution module.

BRIEF DESCRIPTION OF THE SEVERAL VIEWS OF THE DRAWINGS

The present invention is described by way of example hereinafter by means of embodiments with reference to the accompanying Figures.

DETAILED DESCRIPTION

Figure 1:
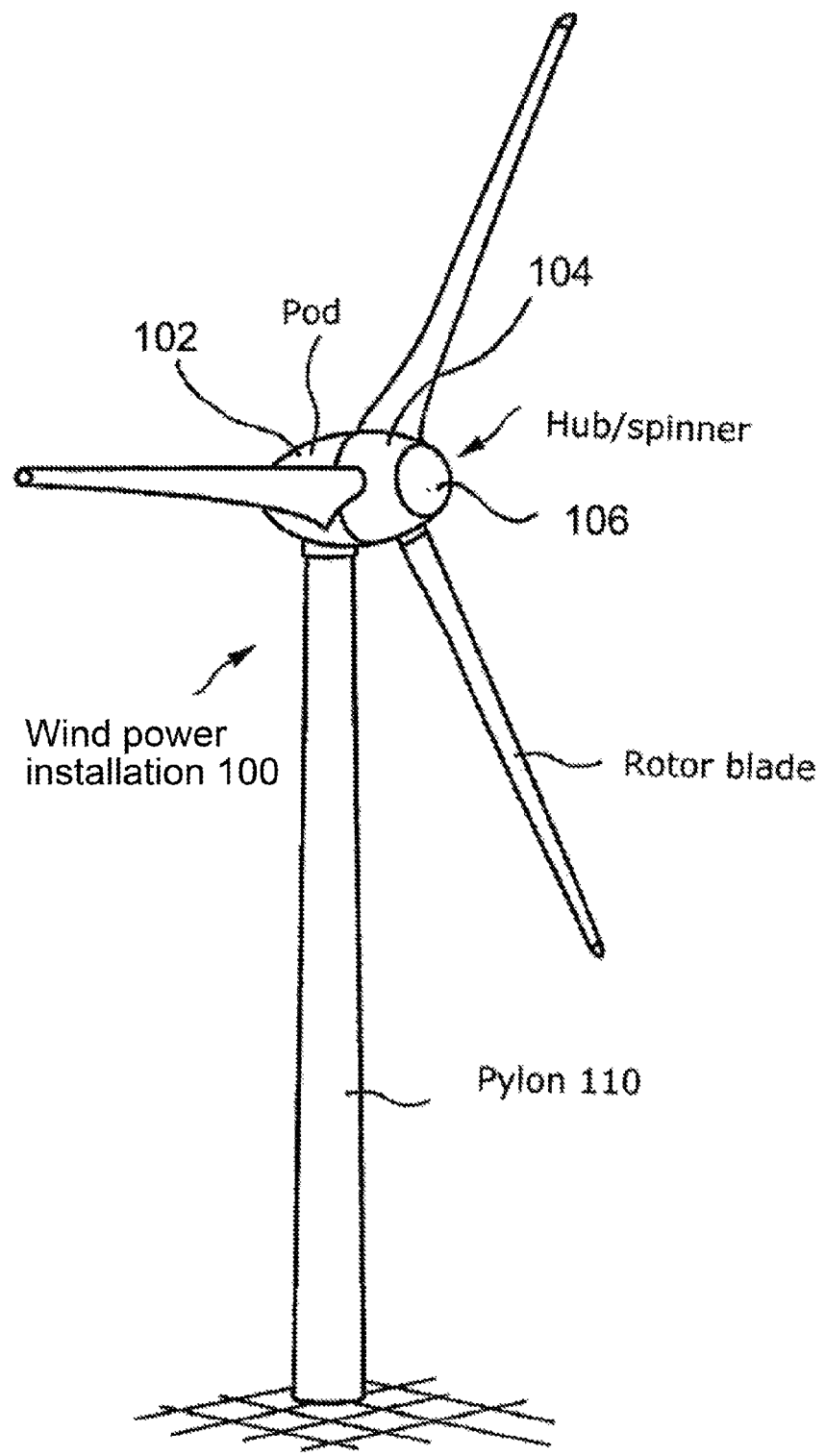
FIG. 1 shows a perspective view of a wind power installation.

FIG. 1 shows a perspective view of a wind power installation with a pylon, and a pod which is arranged on the pylon and has a hub with three rotor blades. Indicated on the pod is a rear pod casing 102 which protects the non-rotating part of the pod and basically identifies the rear part of the pod. The Figure also shows a spinner casing 104 in the region of the attachments of the rotor blades. Finally a spinner cap 106 is shown, which in regular use faces towards the wind. The region of the spinner cap 106 also identifies the front part of the pod.

Figure 2:
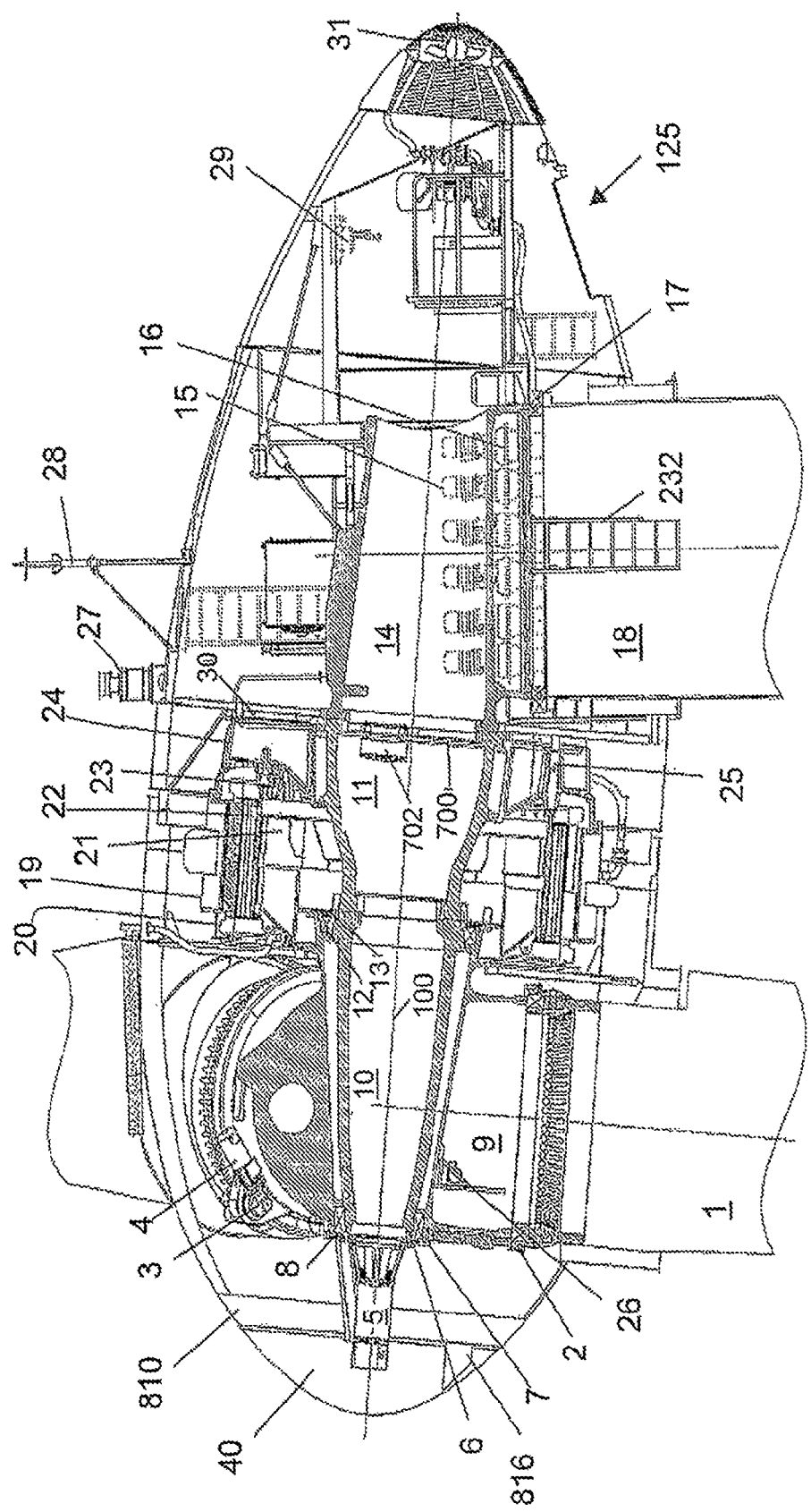
FIG. 2 shows a partly sectional side view of a pod according to the invention.

FIG. 2 basically shows a sectional view of a pod according to an embodiment of the invention. That pod comprises substantially the following components:

A rotor blade 1, a blade flange bearing 2, a blade adjusting transmission 3, a blade adjusting motor 4, a slip ring body 5, a shaft cover 6, a front bearing cover 7, a two-row tapered roller bearing 8, a rotor hub 9, a journal 10, a mounting attachment 11, a cylindrical roller bearing 12, a rear bearing cover 13, a machine carrier 14, an azimuth motor 15, an azimuth transmission 16, an azimuth bearing 17, a pylon with head flange 18, a stator carrier ring 19, a stator plate assembly 20, a disc rotor 21, a pole plate assembly 22, an electromagnetic brake stirrup 23, a stator bell 24, a rotor arresting means 25, a central lubrication installation 26, aviation warning lighting 27, a combi-wind speed transmitter 28, an electric chain hoist 29 designed for example for a load of 250 kg, a pod ventilator 30 and a passive tail cooler 31.

Figure 3:
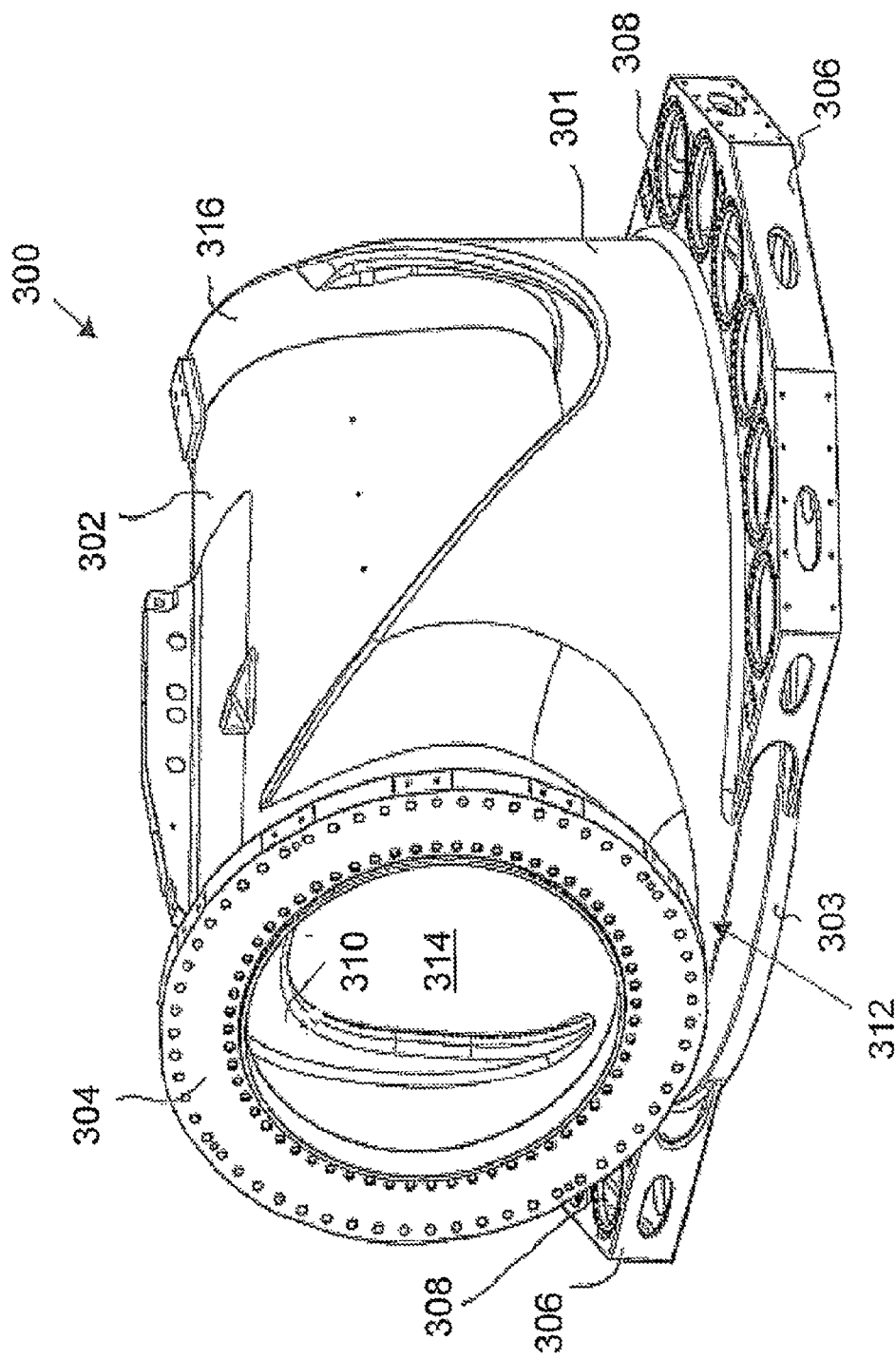
FIG. 3 shows a perspective view of a machine carrier.

The machine carrier 300 in FIG. 3 has a first tubular portion 301 and a second tubular portion 302. The first tubular portion 301 has a substantially vertical central axis. Arranged at the first tubular portion is a first rotor flange portion 303 with which the machine carrier is to be fixed to an azimuth bearing on a pylon. Arranged in the region of the first tube flange 303 are receiving portions 306 for receiving azimuth drives, that is to say azimuth motors. Each receiving portion 306 has six respective motor openings 308 for receiving a respective azimuth motor.

The second tubular portion has substantially a horizontal central axis which is tilted somewhat out of the horizontal. Arranged at the second tubular portion 302 is a second tube flange 304 in order to fix a mounting attachment thereto.

The first and second tubular portions 301 and 302 are thus arranged substantially transversely relative to each other with respect to their central axis. The first tubular portion 301 is of a substantially larger diameter than the second tubular portion 302. The second tubular portion 302 is of such a configuration that it is substantially received by the first tubular portion 301. The first tubular portion 301 also includes an inner support portion 310 provided in the second tubular portion 302. That inner support portion 310 can be seen through an opening of the second tube flange 304 and is required to reinforce the machine carrier 300 in its fillet region 312, that is to say the transition between the first and second tubular portions 301 and 302. The main loading when using that machine carrier 300 is to be expected in that fillet region 312. An opening 314 in the inner support portion 310 is provided as an opening for service personnel to climb therethrough.

A peripherally extending support ridge 316 is arranged at the side remote from the second tube flange of the second tubular portion 302 in the connecting region between the first and second tubular portions 301 and 302. That makes it possible to avoid the provision of a support portion corresponding to the inner support portion 310 at that rearward position of the second tubular portion 302.

Figure 4:
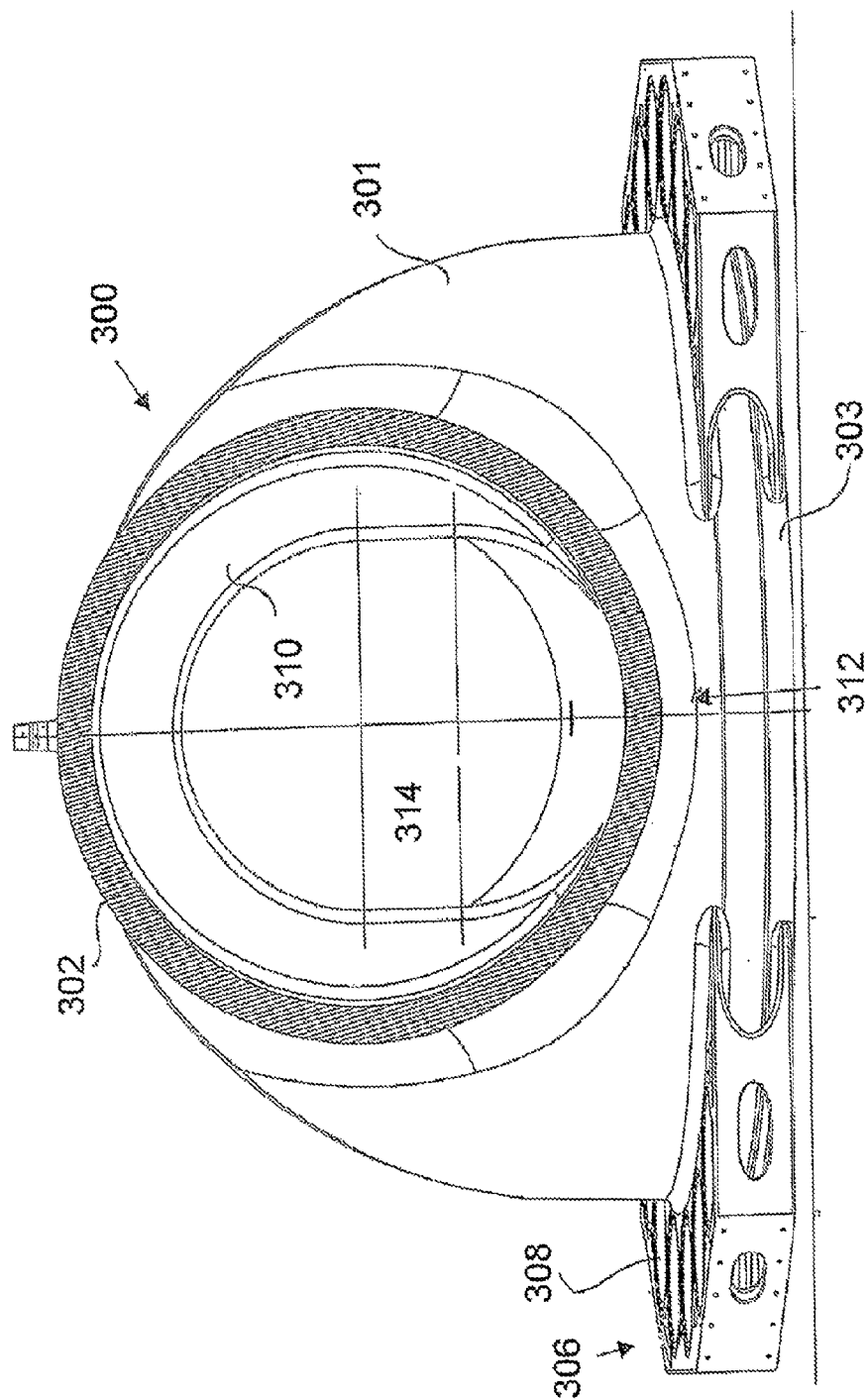
FIG. 4 shows a front sectional view of a machine carrier 300 in FIG. 3.
Figure 5:
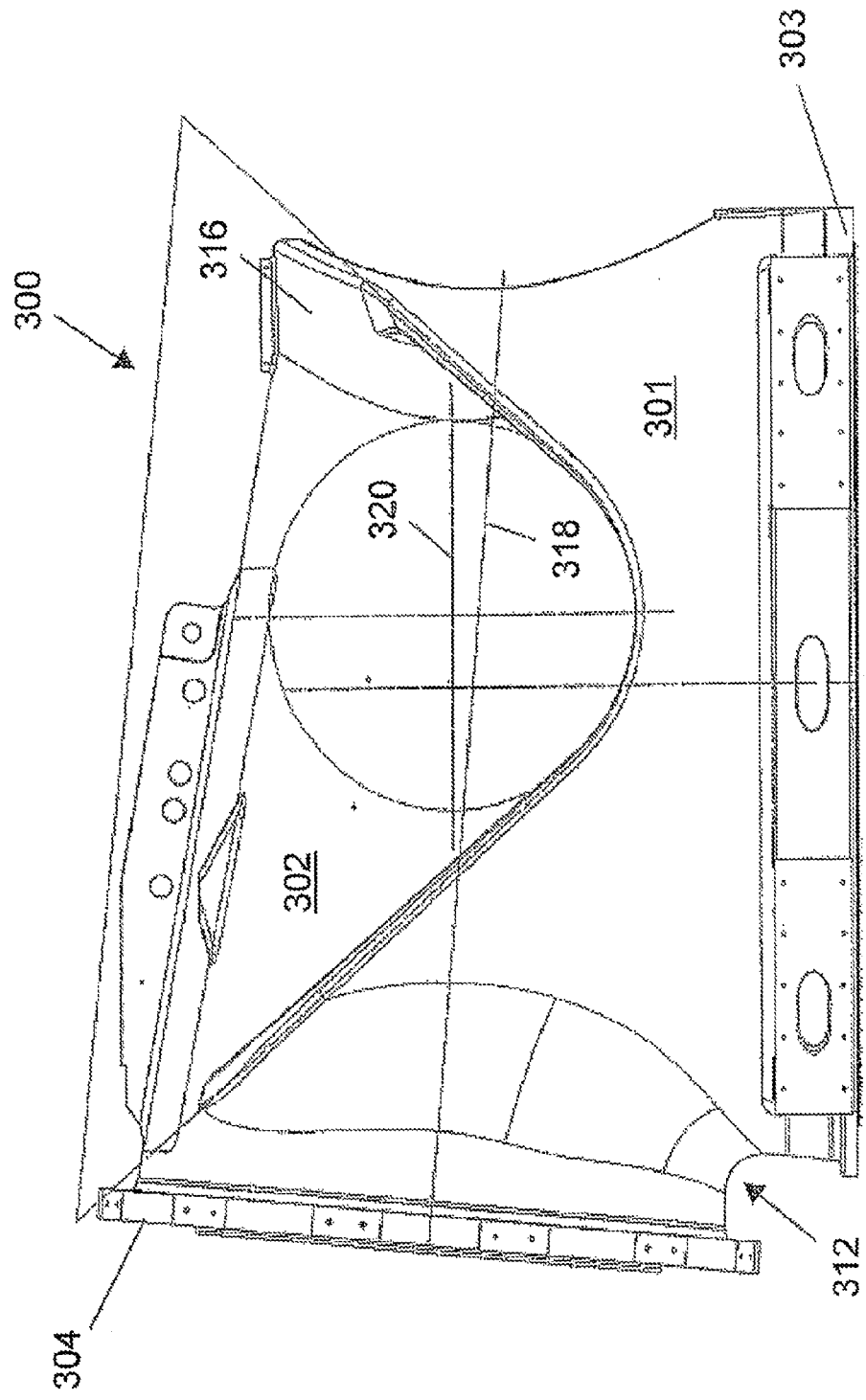
FIG. 5 shows a side view of the machine carrier of FIG. 3.

FIG. 4 shows a view in section from the front of the machine carrier 300 while FIG. 5 shows a side view of the machine carrier 300. FIG. 5 shows the central axis 318 of the second tubular portion 302 and it is possible to see a slightly tilted position with respect to a horizontal auxiliary line 320. In comparison with a horizontal-axis wind power installation, the central axis 318 can still be referred to as substantially horizontal.

Figure 6:
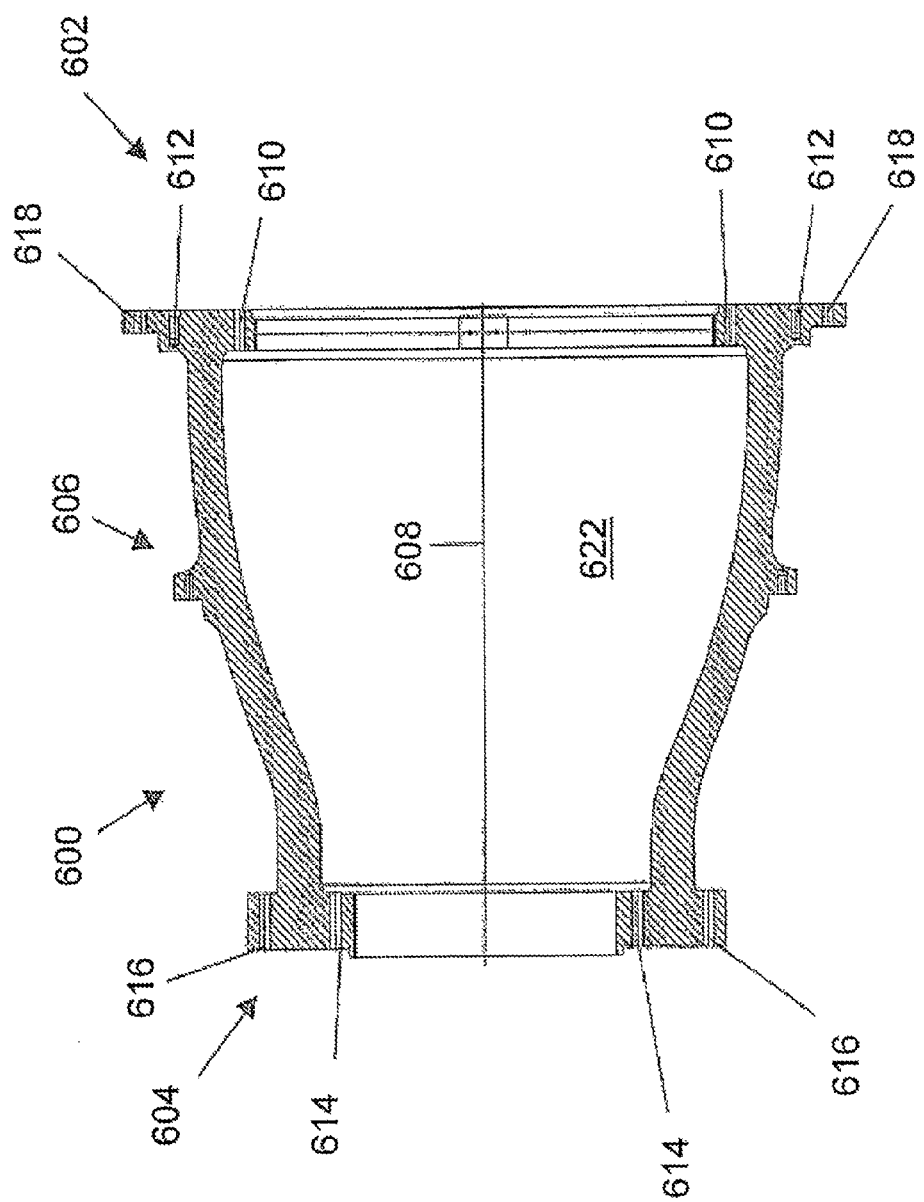
FIG. 6 shows a sectional side view of a mounting attachment.

The mounting attachment 600 in FIG. 6 has a flange 602 at the machine carrier side, a flange 604 at the journal side and a central fixing flange 606. Like basically the entire mounting attachment 600, the flanges 602, 604 and 606 are rotationally symmetrical about the central axis 608 of the mounting attachment. The central axis 608 corresponds to the axis of rotation of the rotor hub, when the arrangement is as normal.

The mounting attachment 600 is to be arranged on and fixed to the second tube flange 304 of the machine carrier 300 in FIG. 3 by means of the flange 602 at the machine carrier side. A plurality of through bores 610 and a plurality of threaded blind bores 612 are provided for fixing purposes.

A plurality of bores 614 and 616 are also provided for fixing a journal to the flange 604 at the journal side.

The central fixing flange 606 and also the flange 602 at the machine carrier side are provided for fixing a stator carrier, namely in particular a stator bell, to the mounting attachment 600. The flange 602 at the machine carrier side has a plurality of through bores 618 for that purpose. In addition the central fixing flange 606 is provided with blind bores 620 having screwthreads. In that way a machine carrier can be arranged in tilting-stable relationship at two axially displaced flanges 602 and 606.

The described manner of assembly of the mounting attachment 600 with the machine carrier 300, a stator carrier and a journal is also shown in FIG. 2. There the mounting attachment is denoted by reference 11, the machine carrier by reference 14, the journal by reference 10 and the stator bell by reference 24.

It can also be seen that the two tubular portions 301 and 302 are conical. The two tubular portions 301 and 302 are of a larger diameter in the region of their first and second tube flanges 303, 304 respectively, than in the region opposite thereto.

Figure 7:
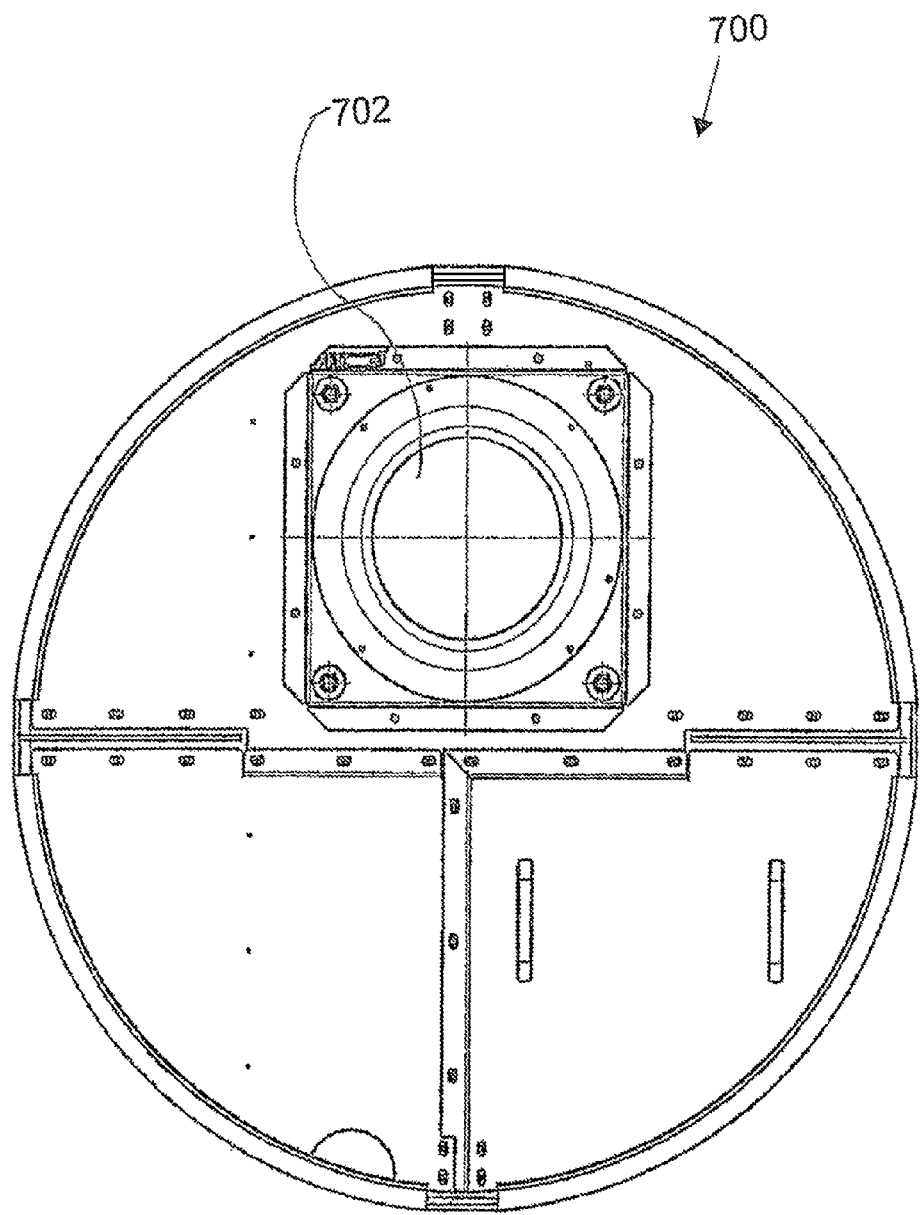
FIG. 7 shows an insert with fan for insertion into an internal space in the mounting attachment of FIG. 6.
Figure 8:
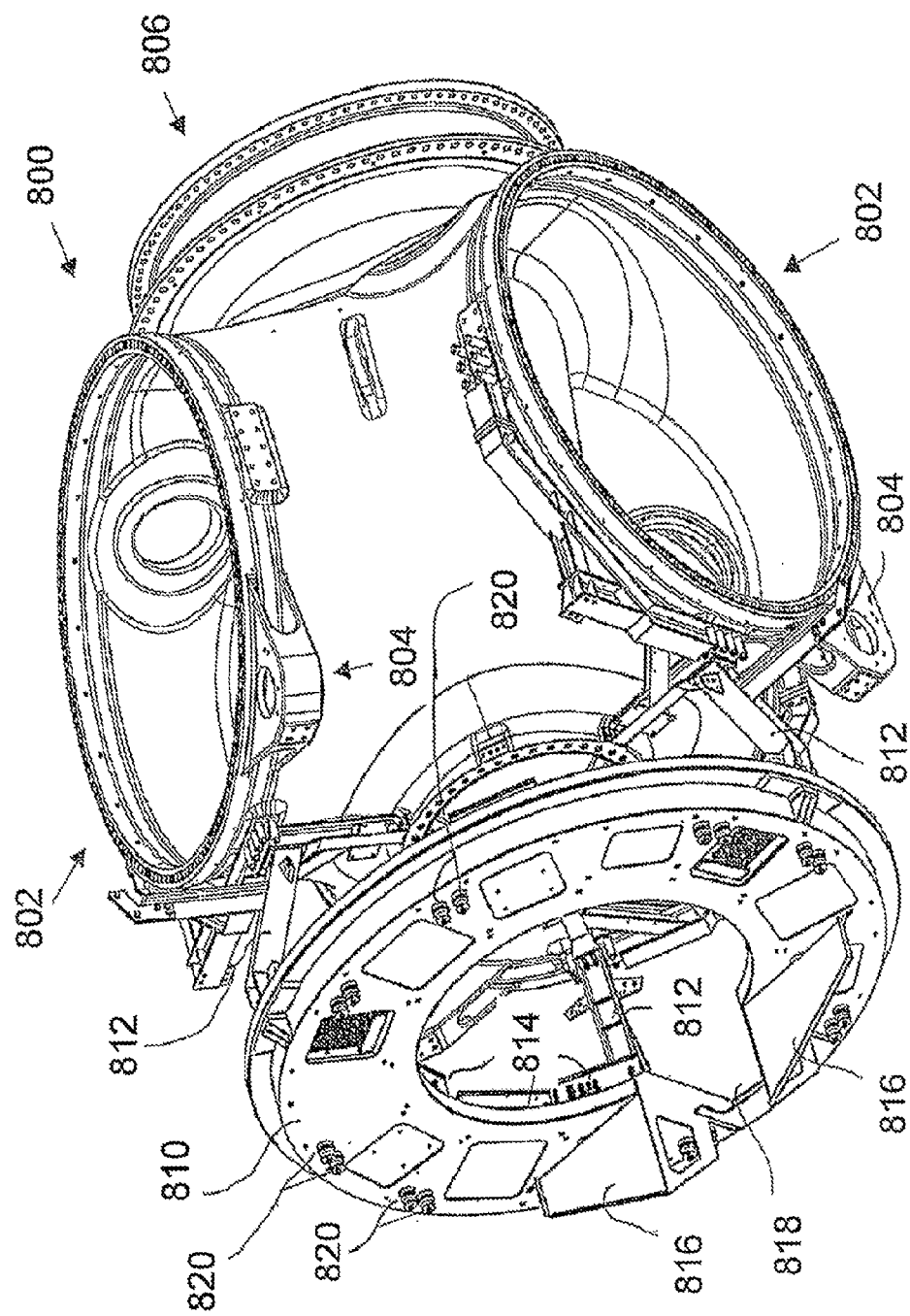
FIG. 8 shows a perspective view of a rotor hub with a module carrier for electric modules.
Figure 11:
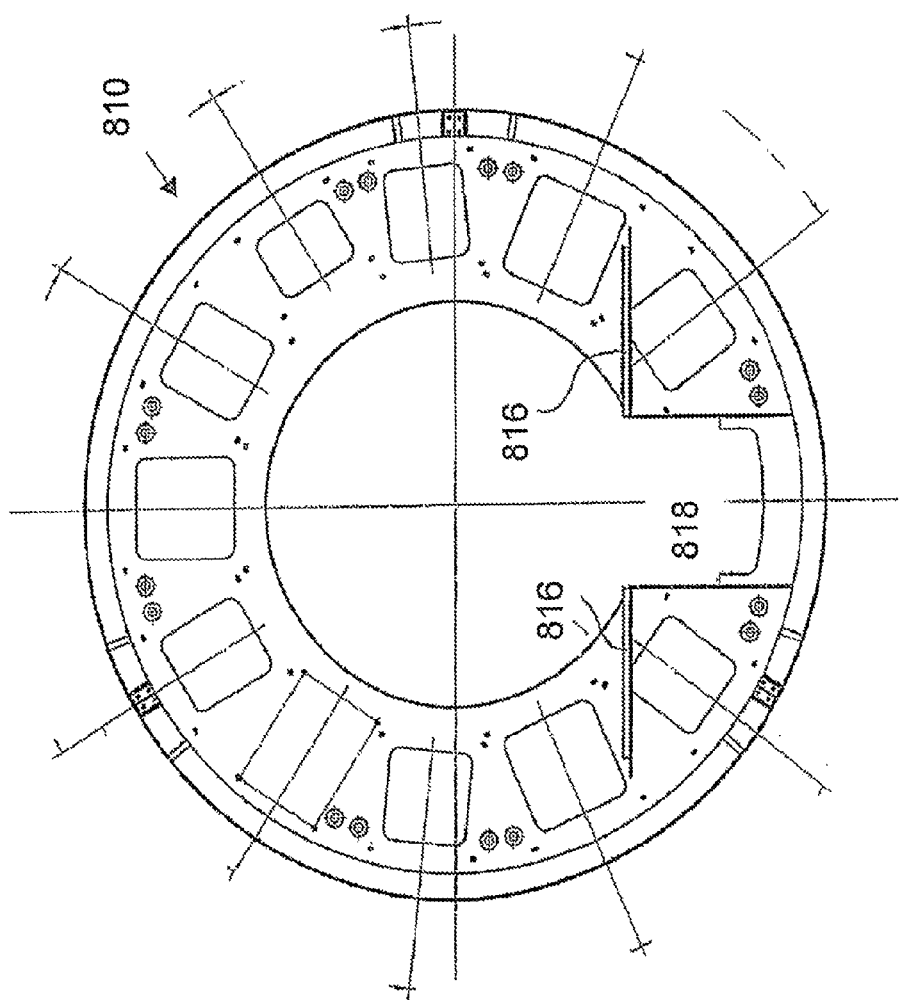
FIG. 11 shows a front view of the module carrier of FIG. 10.

FIG. 7 shows an insert 700 with fan 702 for insertion into a mounting attachment 600 as shown in FIG. 6 or 11 as shown in FIG. 2. That insert 700 with fan 702 is also shown in the inserted condition in FIG. 2. The fan 702 can thus blow the air into the internal space 622 in the mounting attachment 600.

The insert 700 is otherwise of such a configuration that the internal space 622 in the mounting attachment 600 is closed so that air can be blown into the internal space 622 only by means of the fan 702. That also prevents air which has been blown in from issuing in a rearward direction again from the internal space 602. The insert 700 therefore performs the function of carrying the fan 702 and at the same time otherwise closing off the internal space 622 in the mounting attachment 600.

Figure 9:
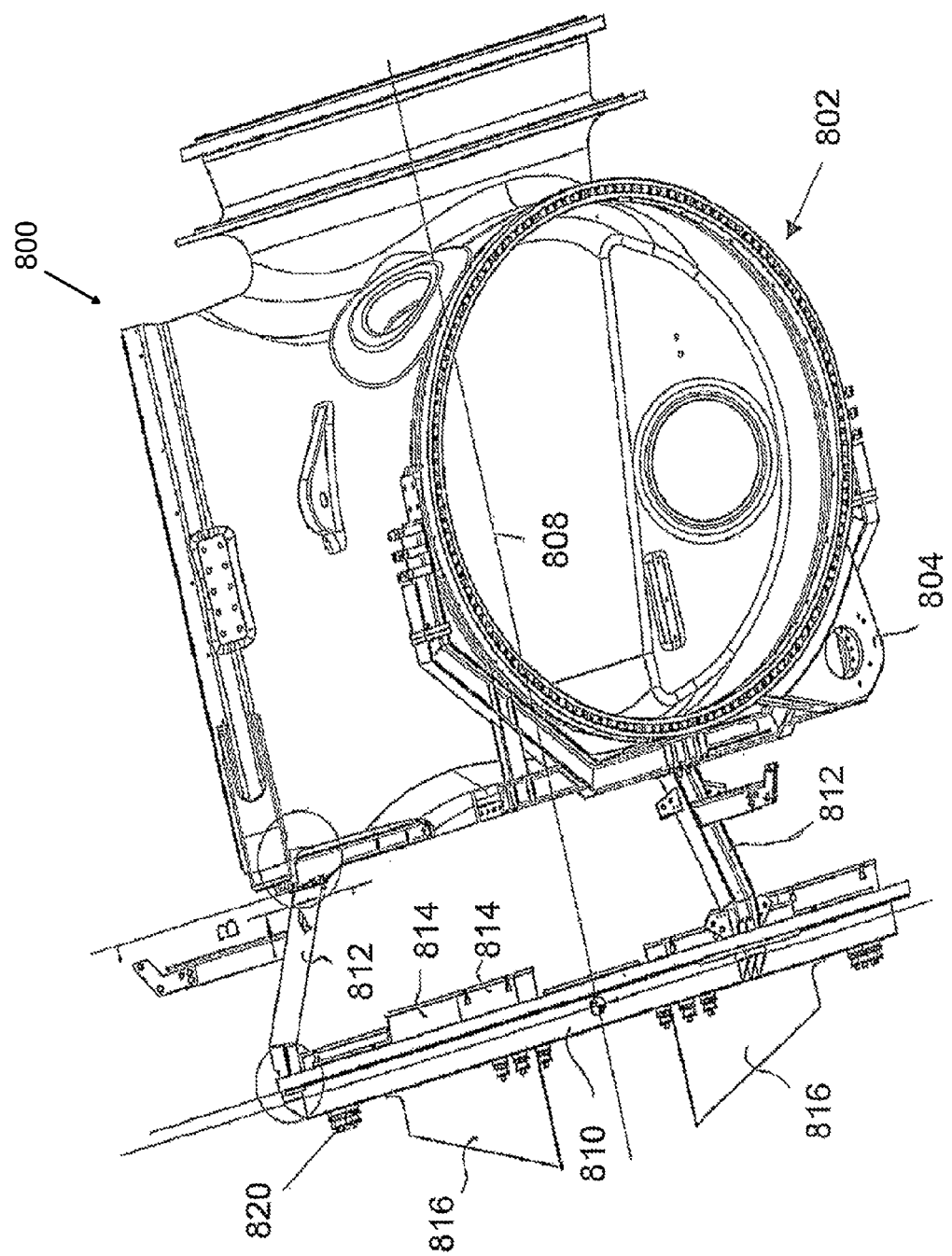
FIG. 9 shows a side view of the rotor hub of FIG. 8 with module carrier.
Figure 10:
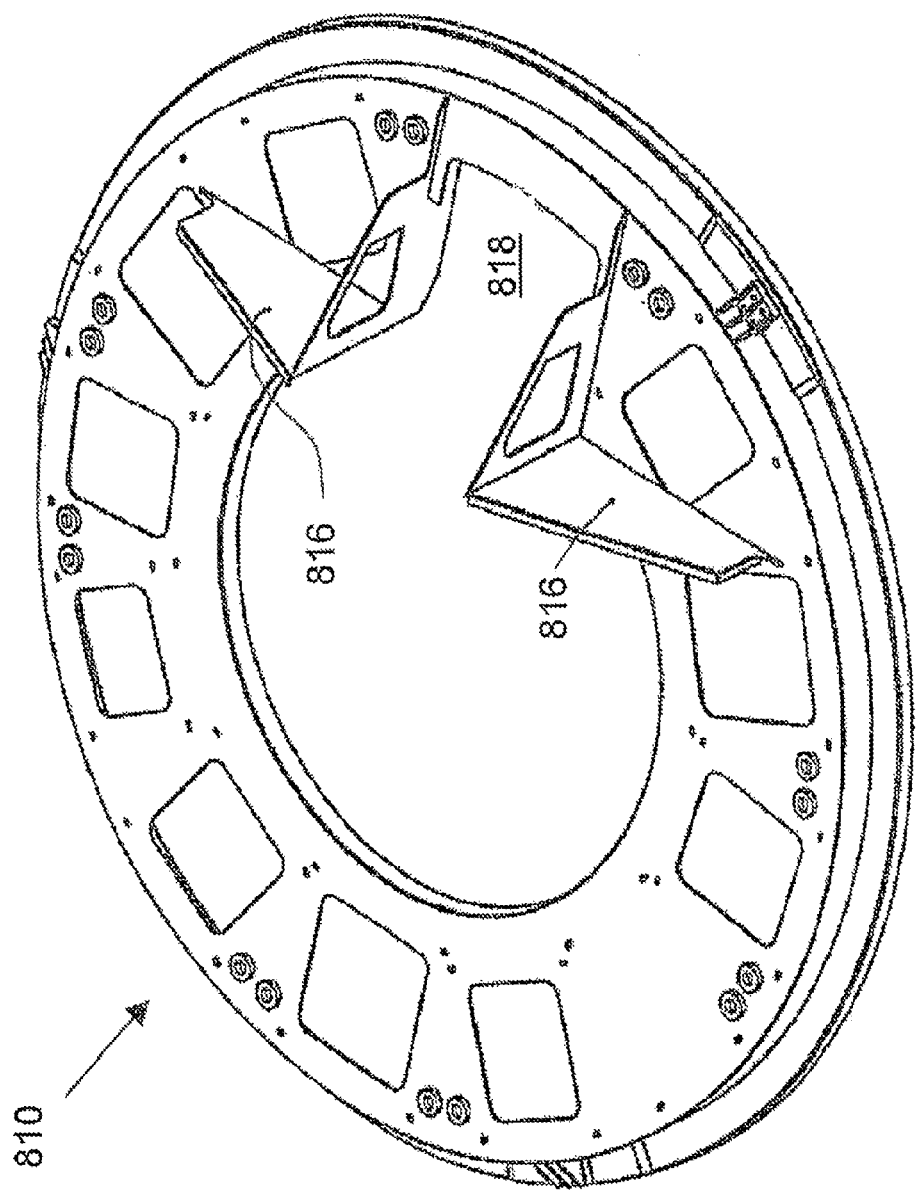
FIG. 10 shows a perspective view of the module carrier of FIGS. 8 and 9 in a condition of not being installed and not being equipped.

The rotor hub 800 has blade receiving means 802 for fixing a respective rotor blade. The rotor blade can then be turned in its angle of incidence by means of pitch drives. For that purpose a pitch motor mounting 804 is provided at each blade receiving means for receiving the pitch drives. In addition the rotor hub 800 has two rotor fixing flanges 806 for non-tiltable connection to the electric rotor, that is to say the rotor member, of the generator. The rotor hub 800 is appropriately rotatably mounted on a journal. In that way the electric rotor fixed to the rotor hub 800 is also mounted rotatably. FIG. 9 shows in that respect the central axis 808 of the rotor hub 800 and therewith the axis of rotation of the aerodynamic and thus at the same time the electric rotor. The arrangement of the rotor hub 800 on a journal is shown in the sectional side view in FIG. 2. There the rotor hub 9 is rotatably mounted on the journal 10 by means of a two-row tapered roller bearing 8 and a cylindrical roller bearing 12. It is also possible to see the fixing of the disc rotor to the rotor hub 9 in the sectional view. In addition FIG. 2 shows an axis 100 which forms an axis of rotation and a central axis for various components.

A module carrier 810 is provided for the provision of various electric modules for the pitch drives which are to be arranged in the pitch motor mounting 804. The module carrier 810 is fixed to the rotor hub 800 by means of fixing struts 812. The module carrier 810 is also arranged substantially concentrically around the central axis 808. Various electric modules 814 are fixed on the module carrier 810. In this case the electric modules 814 face from the module carrier 810 in the direction towards the rotor hub 800.

When the rotor hub 800 is arranged in the appropriate manner on a journal as on the journal 10 shown in FIG. 2 a slip ring body, namely the slip ring body 5 in FIG. 2, projects through the module carrier 810 in the center into the free region. To mount or remove that slip ring body 5 there are provided auxiliary plates 816, on which service personnel can stand and work. An opening 818 is shown between the two auxiliary plates 816. The opening can be used for service personnel for climbing through and as a working space when fitting and removing the slip ring body 5. In particular the slip ring body 5 can be lowered into that opening when being removed.

Elastic connecting means 820 are distributed in pairs over the module carrier 810 for elastically fixing the module carrier 810 to a stator cap which is shown in the form of a spinner cap 40 in FIG. 2.

The arrangement of the slip ring body 5, the module carrier 810 and the spinner cap 40 is indicated in FIG. 2.

The modules for supplying the pitch drives can be provided in a simple manner by virtue of the use of the module carrier 810. Previously known positioning of such electric modules on the disc rotor can be improved thereby.

Figure 12:
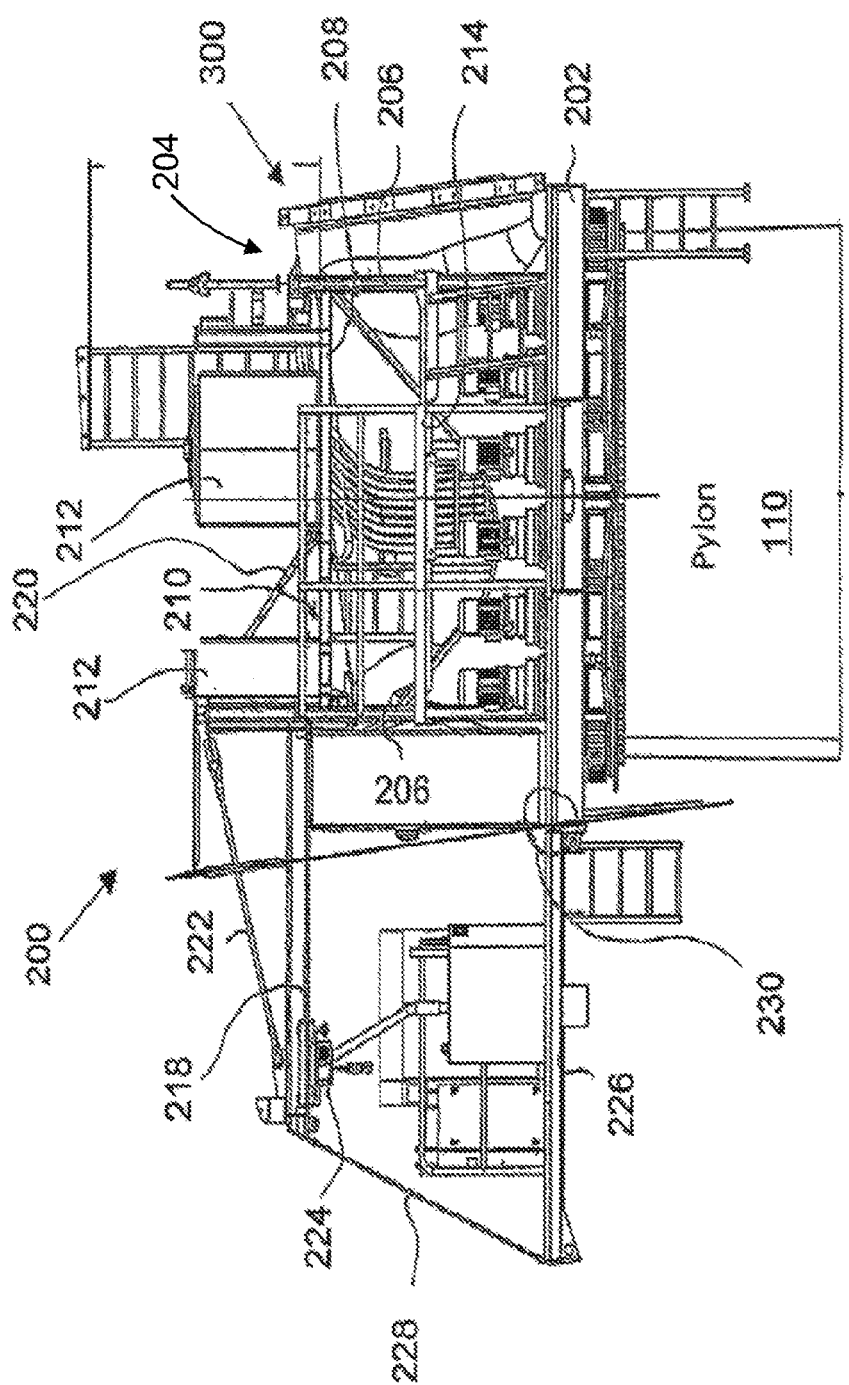
FIG. 12 shows a side view of a part of a pod structure with machine carrier.

FIG. 12 shows a machine carrier 300 arranged above a pylon 110. The pod structure 200 is fixed to the machine carrier 300 and substantially built therearound. The pod structure 200 has a base platform portion or base platform 202 which is fixed to the machine carrier 300, in particular there to the receiving portions 306, in flexurally stiff fashion. Arranged on the base platform or the base platform portions 202 is a support structure 204 having a plurality of vertical support struts 206 and horizontal support struts 208. That affords a stable support structure 204 which basically reconstructs the machine carrier 300. In addition above the machine carrier 300 that support structure forms an upper working platform on which service personnel can stand and work and on which electric modules 212 such as for example a rectifier or other switch cabinets can be arranged.

An intermediate platform 214 is provided approximately at half height between the base platform 202 or the base platform portion 202 and the upper working platform 210. As can be seen from FIG. 13 such an intermediate platform is provided on each side of the machine carrier 300. Azimuth motors 216 and azimuth drives 216 are arranged beneath that intermediate platform 214. Thus it is possible to gain access to the azimuth drives 16 from the intermediate platform 214, through releasable floor panels.

In addition a projecting support portion 218 substantially in the form of a steel carrier is arranged on the support structure 204. That projecting support portion 218 is additionally held to the support structure 204 by way of first and second holding bars 220 and 222.

The projecting support portion 218 performs at least two functions, namely there is provided a crane device 224 for handling loads and possibly also for lifting them from the exterior into the pod. A load opening 125 is also correspondingly provided in FIG. 2 beneath the crane which is there denoted by reference 29.

In addition the projecting support portion 218 serves to carry a suspended platform portion 226 by means of two third holding bars 228. The suspended platform portion 226 is further secured for that purpose to the base platform portion 202 in a connecting region 230. The fixing in relation to the connecting region 230 however is not flexurally stiff. Fixing in the region of the connecting region 230 and holding by means of three holding bars 228 provides that suspended platform portion 226 in a simple fashion. Preferably any electronic lines can be laid in the suspended portion or suspended platform portion 226.

Figure 13:
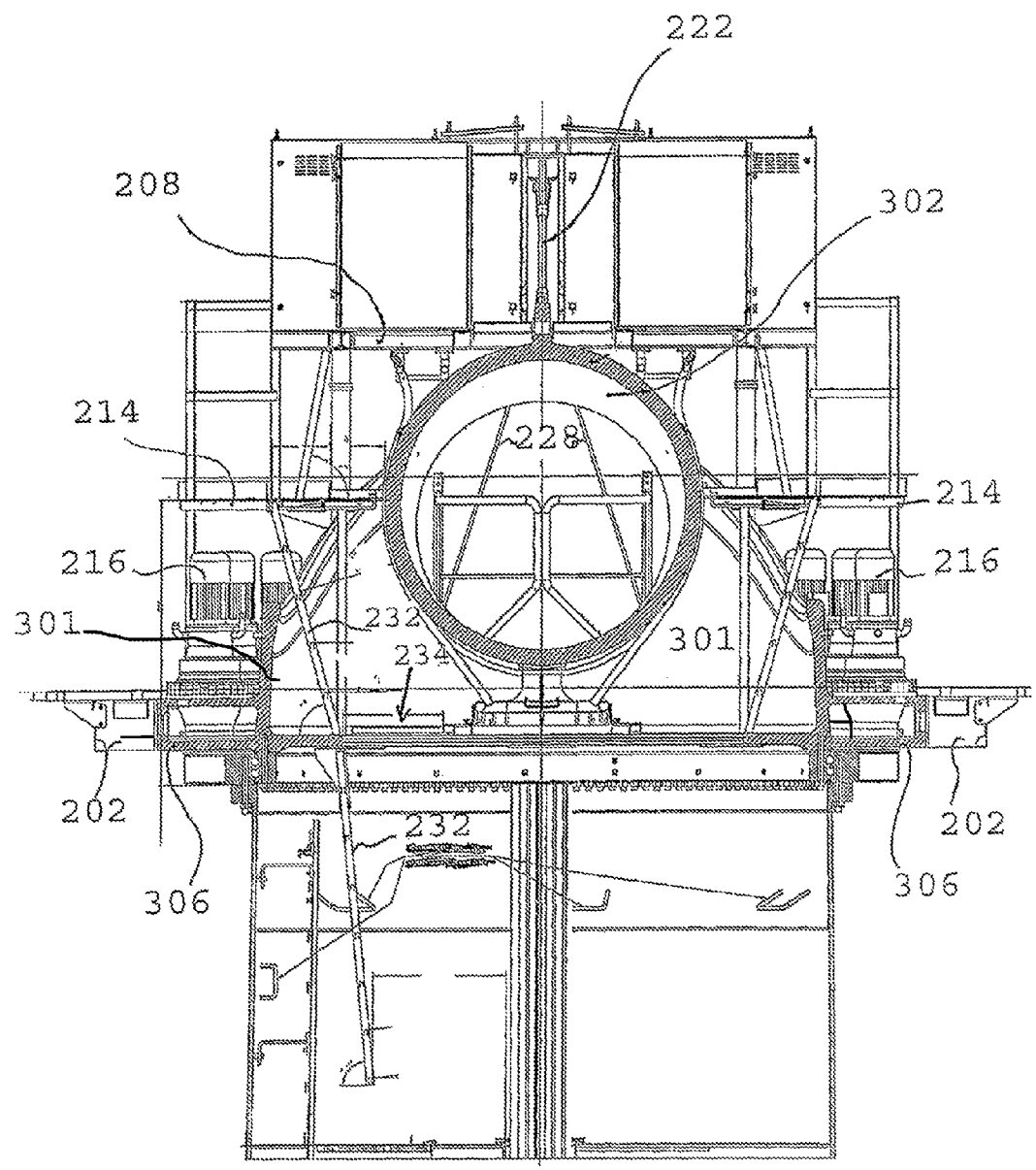
FIG. 13 shows a sectional view from the front of the pod structure of FIG. 12.

FIG. 13 also shows an entrance ladder 232 extending from the pylon to the pod. The entrance ladder 232 thus also shows a way from the pylon to the pod through the entrance opening 234 and the entrance path thus passes through the first tubular portion 301 and at the outside past the second tubular portion 302.

Advantageously a described intermediate platform 214 is provided above the azimuth motors. That configuration is advantageous even when the arrangement does not include an upper platform above the machine carrier.

Figure 14:
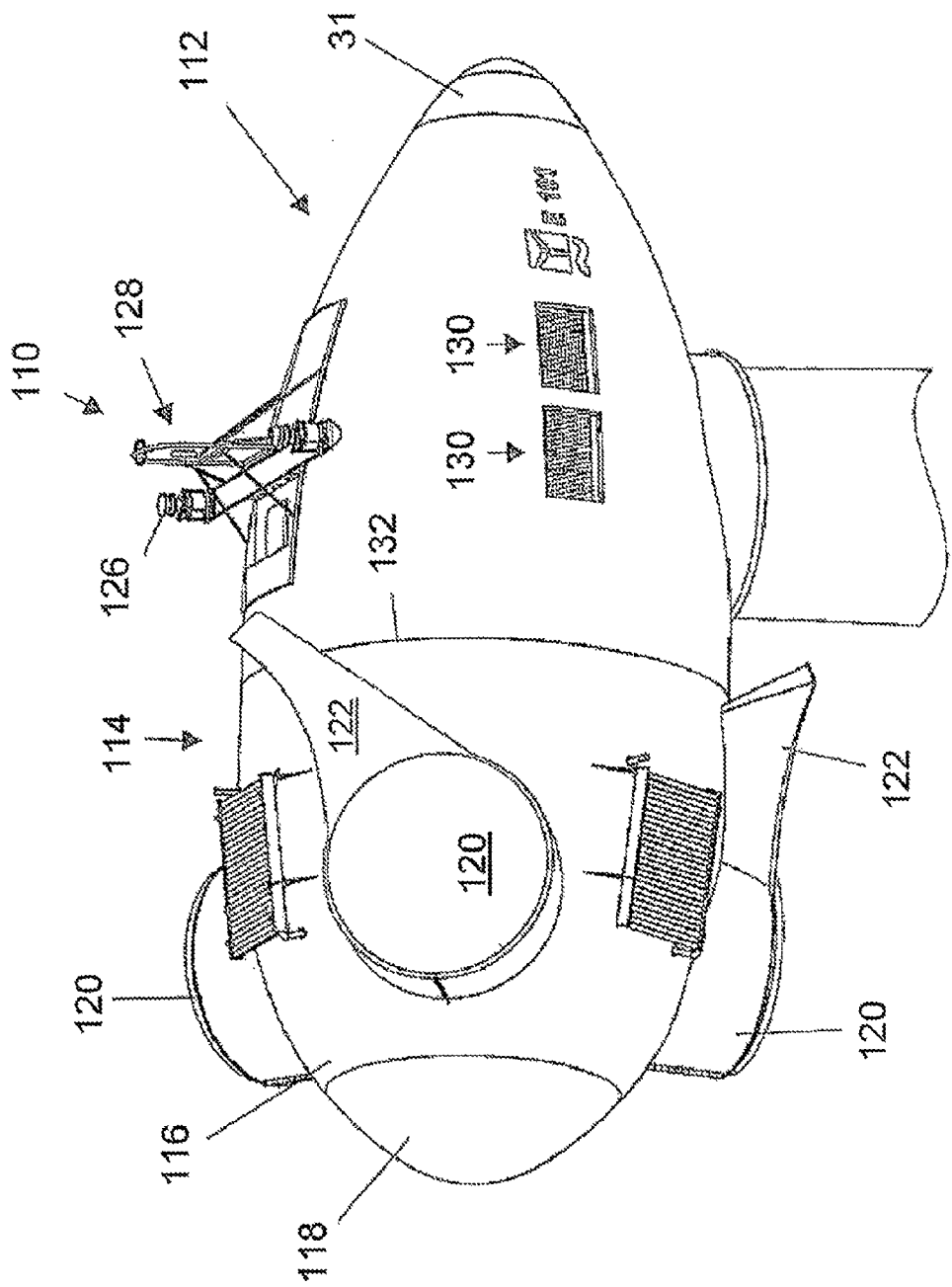
FIG. 14 shows a diagrammatic perspective view of a pod.

The pod 110 in FIG. 14 has a stationary pod casing 112 and a spinner 114 with spinner casing 116 and a spinner cap 118. For the sake of simplicity FIG. 14 does not show any rotor blades but only the mounting 120 thereof, and one fixed rotor blade extension 122. Cooling bodies 124 are also shown. FIG. 14 also indicates an obstacle lighting arrangement 126, a measurement mast 128 and also diagrammatically a passive tail cooler 31.

In addition two air openings 130 in the fixed pod casing 112 are shown. Those air openings 130 have droplet separators so that air can flow into the pod through those openings 130 and any moisture in the form of droplets is removed. Preferably at least one of those droplets separators of the air openings 130 is heatable in order to prevent the droplet separator from freezing up and thus to prevent the openings 130 from being closed, at cold outside temperatures. As there is only a reduced need for cooling at low outside temperatures, it may be sufficient for only a part of the air openings 130 to be provided with such a heating device.

Air which passes into the pod through those air openings 130 and passes into the spinner for example through the mounting attachment 11 and the journal 10—as shown in FIG. 2—can issue again through a connecting region 132 between the spinner casing 116 and the fixed pod casing 112.

It can also be seen from FIG. 2 that the diameter of the generator, in particular the stator ring 19 and the stator plate assembly 20, is markedly smaller than the diameter of the pod casing of the pod in that region.

The invention claimed is:

1. A module carrier comprising:
   electric modules configured to control one or more pitch drives of a wind power installation;
   a main body that is a flat disk shape and includes a receiving surface that receives and holds the electric modules; and
   fixing struts coupled to the main body and configured to couple the main body to a rotor hub of the wind power installation, wherein when the main body is coupled to the rotor hub, the rotor hub is adapted to rotate about a substantially horizontal rotor axis and the receiving surface is perpendicular to the rotor axis of the rotor hub, and wherein the main body is adapted to be fixed in front of the rotor hub in an axial direction of the rotor axis.

2. The module carrier according to claim 1 wherein the main body has a periphery adapted to a spinner casing and has fixing means for elastic connection to the spinner casing.

3. The module carrier according to claim 1 wherein the wind power installation has one or more rotor blades and the electric modules include at least one of the following elements:
   a transformer module for supplying the pitch drives with electrical energy;
   a distribution module for direct or indirect distribution of digital information to each pitch drive;
   a blade regulating module for each rotor blade for controlling the respective pitch drive;
   a blade relay module for each rotor blade for carrying out electrical switching-over operations for the respective pitch drive; and
   a storage module for each rotor blade for storing and providing electric energy for the respective pitch drive.

4. A rotor hub of a wind power installation comprising:
   a module carrier according to claim 1, wherein the module carrier is arranged rigidly by means of holding devices at the rotor hub at its side towards the wind, and wherein the module carrier is arranged with its main body substantially perpendicularly to the rotor axis, and wherein the module carrier is elastically connected to a spinner casing of the rotor hub.

5. A machine carrier of a gearless wind power installation comprising:
   means for carrying an electric generator connected to an aerodynamic rotor of the wind power installation on a pylon, wherein the aerodynamic rotor has a substantially horizontal rotor axis and the pylon has a substantially vertical pylon axis; and
   first and second substantially tubular portions, each arranged substantially perpendicularly to each other, wherein the first tubular portion has a first opening that receives at least a portion of the second substantially tubular portion, and wherein the first substantially tubular portion includes an inner support portion provided in the second substantially tubular portion to reinforce a fillet region of the machine carrier.

6. The machine carrier according to claim 5 wherein at least one of:
   the first tubular portion has a central axis coincident with the vertical pylon axis;
   the second tubular portion has a central axis coincident with the rotor axis;
   the first tubular portion is of a larger mean diameter than the second tubular portion; and
   the first and second tubular portions are conical.

7. The machine carrier according to claim 5 wherein a lateral passage opening is so provided such that a person has access to a pod of the wind power installation from the pylon at the inside through the first substantially tubular portion and at the outside past the second tubular portion.

8. The machine carrier according to claim 5 wherein the machine carrier is in the form of a casting and has receiving means for azimuth drives.

9. A generator support structure for carrying an electric generator of a gearless wind power installation, the electric generator including a stator and an electric rotor, the generator comprising:
   a machine carrier according to claim 5;
   a mounting attachment for fixing to the machine carrier;
   a stator carrier for fixing to the mounting attachment and for carrying the stator; and
   a journal for fixing to the mounting attachment and for carrying at least one of the electric rotor and a rotor hub with an aerodynamic rotor.

10. The generator support structure according to claim 9 wherein at least one of the mounting attachment and the journal is hollow for guiding cooling air to the rotor hub, and wherein at least one of the mounting attachment and the journal has a fan for producing an air flow therethrough.

11. A pod a wind power installation comprising:
 a base platform portion located inside of the pod and fixed to a machine carrier in flexurally stiff relationship;
 a suspended platform portion located inside of the pod and fixed in suspended relationship to at least one of the machine carrier and the base platform portion;
 an upper platform located inside of the pod and above the base platform portion; and
 an intermediate platform located between the base platform portion and the upper platform.

12. The pod structure according to claim 11 wherein:
 a support structure is arranged on and fixed to the base platform portion, and the support structure has a projecting carrier portion having a crane device for lifting loads;
 a tensile carrier connected to the suspended platform portion for partially suspending the suspended platform portion on the projecting carrier portion; and
 wherein the intermediate platform has at least one movable floor panel to provide access to azimuth drives through the intermediate platform.

13. A pod of a gearless wind power installation for receiving technical devices required for operation of the wind power installation, the pod comprising:
 a pod casing for protecting the technical devices from weather; and
 ventilation openings in the pod casing that allow outside air to enter the pod for ventilating the pod and for cooling at least parts of the wind power installation, wherein the ventilation openings have droplet separators to separate moisture from inflowing air.

14. The pod according to claim 13 comprising:
 a pod structure including a base platform portion fixed to a machine carrier in flexurally stiff relationship, and a suspended platform portion fixed in suspended relationship to at least one of the machine carrier and the base platform portion;
 a module carrier including a main body for carrying the electric modules, a rotor hub being adapted to rotate about a substantially horizontal rotor axis, and the main body being adapted to be fixed in front of the rotor hub in an axial direction of the rotor axis; and
 a machine carrier that includes first and second substantially tubular portions each arranged substantially perpendicularly to each other, wherein the first tubular portion at least partially passes through the second tubular portion, and wherein the second substantially tubular portion at least partially passes through the first substantially tubular portion.

15. A gearless wind power installation, comprising
 a pylon; and
 a pod according to claim 13, further comprising a sealing means to prevent the passage of outside air to a transitional region between the pod casing and the pylon.

16. A method of operating a wind power installation, the method comprising:
 receiving air through at least one droplet separator in a pod casing such that the air is received in a first part of a pod;
 blowing the air from the first part of the pod through at least one of a mounting attachment and a journal into a second part of the pod, the second part of the pod including a region of a rotor hub and rotor head; and
 issuing the air from the pod in the second part of the pod to a transitional region between a spinner casing and the pod casing.

* * * * *